Aug. 9, 1949.  L. W. WIGHTMAN  2,478,649
FLUID SEAL
Filed Dec. 29, 1945   2 Sheets-Sheet 1

Inventor:
Lawrance W. Wightman,
by  *Prarcell S. Mack*
His Attorney.

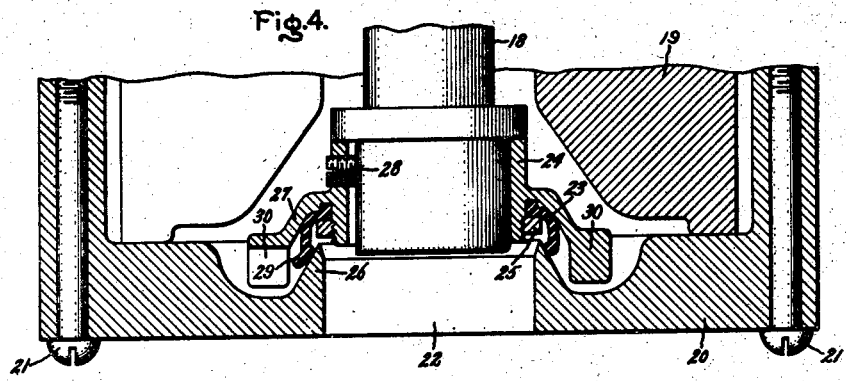
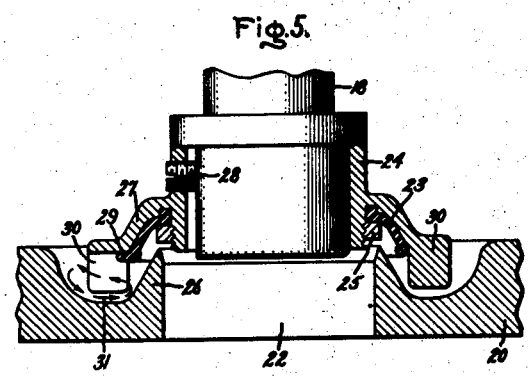
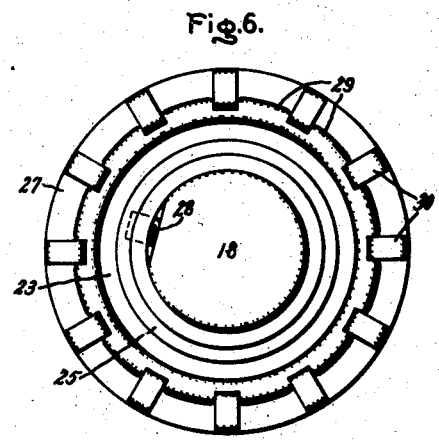
Inventor:
Lawrance W. Wightman,
by Brazell F. Mack
His Attorney.

Patented Aug. 9, 1949

2,478,649

UNITED STATES PATENT OFFICE 2,478,649

FLUID SEAL

Lawrance W. Wightman, Fort Wayne, Ind., assignor to General Electric Company, a corporation of New York Application December 29, 1945, Serial No. 638,375

4 Claims. (Cl. 286—11.11)

This application relates to seals particularly adaptable for preventing the passage of a fluid, such as a lubricant, along the rotatable member which extends through an opening in a wall.

An object of my invention is to provide an improved fluid seal for a rotatable member which extends adjacent an opening in a wall.

Another object of my invention is to provide an improved fluid seal for a rotatable shaft which extends through or adjacent an opening in a wall in which the seal is arranged in positive fluid sealing engagement with a part of the wall or with a baffle secured to the wall when the shaft is stationary and to be deflected out of sealing engagement when the shaft is rotated and combined with a slinger or fluid circulating type seal for preventing the passage of fluid along the rotatable shaft under these conditions.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
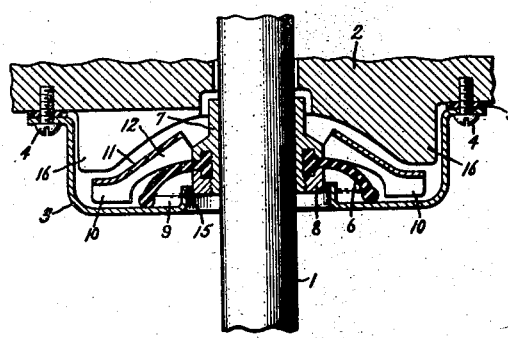
Figure 2:
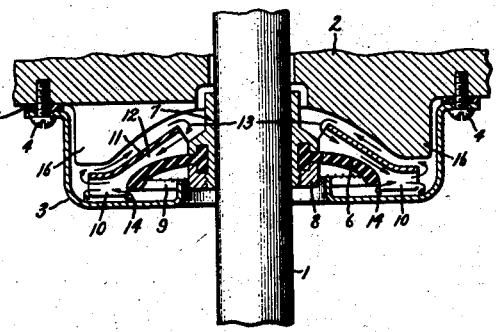
Figure 3:
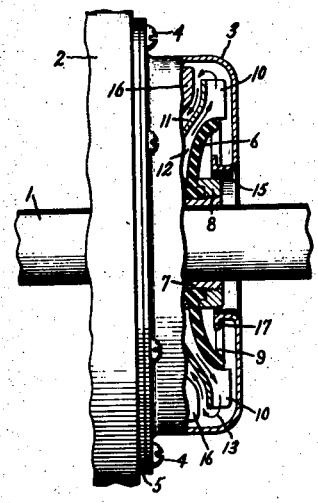

In the drawing, Fig. 1 is a sectional elevational view of one embodiment of my improved combined seal construction illustrating the arrangement under stationary conditions; Fig. 2 is a sectional elevational view similar to Fig. 1 showing the position of the flexible sealing member when the rotatable member is in operation; Fig. 3 is a side elevational view, partly in section, illustrating another embodiment of my invention adaptable for use with a horizontal shaft member; Fig. 4 is a sectional elevational view of a third embodiment of my invention illustrating the position of the flexible member when the shaft is stationary; Fig. 5 illustrates the arrangement shown in Fig. 4 when the shaft is rotated; and Fig. 6 is a plan view of my improved seal construction shown in Figs. 4 and 5.

Referring to the drawing, I have shown an embodiment of my improved seal in Figs. 1 and 2 applied to a vertically extending rotatable shaft 1 which extends through stationary member wall section 2. In this construction, the seal arrangement includes a stationary member sealing plate or baffle 3 secured to the wall 2 in any suitable manner, as by screws 4, which extend through a suitable sealing gasket 5 for providing a fluid seal between the baffle plate 3 and the wall 2. The seal includes a lubricant-resisting substantially cone shaped flexible disk member 6 of any suitable material, such as synthetic rubber, which is secured to the rotatable shaft 1 in any suitable manner, as by being clamped to a mounting ring 7 by a retaining nut element 8 and is adapted to assume a position with an outer enlarged peripheral edge 9 biased into fluid sealing engagement with the inner surface of the baffle plate 3 under stationary conditions, thereby preventing the passage of fluid longitudinally of the shaft 1. A slinger or circulating type seal is combined with this flexible disk or diaphragm 6 and includes a plurality of outwardly extending vanes 10 formed on a supporting plate 11 mounted on the ring 7 and formed with outwardly extending passages 12 which communicate with the upper side of the mounting ring 7 in back of the sealing diaphragm 6. As shown in Fig. 2, when the shaft 1 is rotated, the sealing diaphragm 6 is deflected outwardly under centrifugal force out of engagement with the wall 3 and into engagement with the inner edges of the vanes 10 providing a closure over the front side of the passages 12 through the supporting member 11, thus providing for the circulation of fluid through the fluid passages 12, as indicated by the arrows 13, and outwardly by the blades 10 to provide for recirculation of such fluid over the supporting member plate 11 and back through the passages 12. Some of the fluid may be recirculated directly in the lower portion of the baffle plate 3, as indicated by the arrows 14, although such fluid will generally flow as indicated by the arrows 13, and, in any case, the fluid circulating as shown by the arrows 14 will be thrown outwardly by the blades 10 and will be prevented from passing along the shaft 1. In order further to insure against the passage of fluid past the seal, the baffle wall plate 3 is formed with an inturned flange or lip 15 which extends upwardly between the seal and the shaft to provide, in effect, a small collection reservoir in the lower portion of the seal. In this construction, vanes 16 are formed on the walls 2 and extend towards the back surface of the seal supporting member plate 11 to prevent the formation of a meniscus over the back of the sealing member and to insure that the fluid is always fed into the inlet, as indicated by the arrows 13. Furthermore, since the clearance between the outer faces of the impeller vanes 10 and the plate 3 is relatively small, very little fluid will tend to flow along the plate 3 towards the lip 15.

This same type seal may be used for a horizontally extending rotatable member, as shown in Fig. 3, in which similar parts are given the same reference numerals as in Figs. 1 and 2, and in this construction, the main difference is the addition of a lip 17 along the inner edge of the inturned flange 15 of the baffle plate 3. The function of this lip 15 is to prevent the falling of any fluid past the inturned flange 15 by the collection of this fluid between the lips 17 and the plates 3, and the draining of this fluid along the passageway or channel formed by the lip 17 to the lower portion of the reservoir which is formed by the baffle plate 3, from which it is prevented from passing outwardly along the shaft 1. This seal functions otherwise in the same manner as that described with respect to the construction shown in Figs. 1 and 2.

In Figs. 4, 5, and 6, I have shown a third embodiment of my improved seal construction in which the rotatable member is provided with a seal which is adapted to prevent the passage of fluid along a rotatable member, such as a shaft 18, which extends adjacent an opening in a wall 19 to which a sealing baffle plate 20 is secured in any suitable manner, as by the bolts 21. The seal is adapted to prevent the passage of fluid along the shaft 18 and out through an opening 22 formed in the baffle plate 20 and includes a flexible lubricant-resisting conical disk or diaphragm 23 formed of any suitable material, such as a synthetic rubber, which is secured to the rotatable shaft 18 in any suitable manner, as by a mounting ring 24 to which the sealing diaphragm 23 is secured by a suitable nut 25. As shown in Fig. 4, under stationary conditions, the resilient sealing diaphragm element 23 is deflected or biased inwardly into engagement with an inwardly extending lip 26 formed on the baffle plate 20 to provide a positive sealing engagement therewith to prevent the passage of fluid between the sealing element and the lip 26. When the rotatable shaft 18 is operated, the sealing diaphragm element 23 is deflected outwardly, as shown in Fig. 5, under the action of centrifugal force into engagement with the underside of a mounting plate 27 formed as a part of the mounting ring 24 which is secured in position on the shaft 18 in any suitable manner, as by a set-screw 28. In this construction, the resilient diaphragm sealing member 23 is formed with a scalloped outer edge 29 which is adapted to be deflected outwardly over the inner edges of a slinger or circulating type sealing member formed by vanes 30 integrally secured to the mounting plate 27 and adapted to circulate fluid, as indicated by the arrows 31 in Fig. 5, to prevent the passage of fluid upwardly along the lips 26 of the sealing baffle plate 20, thereby preventing the passage of fluid axially along the shaft 8 past the seal construction. In this manner, the fluid is recirculated only at the bottom of the blade, requires less power to drive the seal than an arrangement such as that shown in Figs. 1 to 3, inclusive, and has been found to operate quite successfully.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A seal for a rotatable member having a part extending through a wall, said seal including a mounting member secured to said rotatable member and having centrifugal impeller blades on the front side adjacent the outer edge thereof with outwardly extending fluid circulating passages extending between said blades and the back side of said mounting member, and means including a flexible member secured on the front side of said mounting member with a part extending into positive sealing engagement with said wall when stationary and having such flexibility as to be deflected outwardly under centrifugal force out of engagement with said wall when rotated providing a closure over the front side of said mounting member fluid passages and providing for the recirculation of fluid through said fluid passages and outwardly by said blades for minimizing the passage of fluid longitudinally of said rotatable member.

2. A seal for a rotatable member having a part extending adjacent an opening in a wall, said seal including a mounting member secured to said rotatable member and having impeller blades on one side adjacent the outer edge thereof, means including a flexible member secured on the front side of said mounting member with a part extending when stationary into positive sealing engagement with a part extending from said wall and having such flexibility as to be deflected outwardly out of engagement with said wall part by centrifugal force when rotated and providing for the circulation of fluid outwardly by said blades for minimizing the passage of fluid longitudinally of said rotatable member through said wall opening, and means including stationary vanes arranged in back of said mounting member for preventing the formation of a fluid meniscus in back of said mounting member on rotation thereof.

3. A seal for a rotatable member having a part extending adjacent an opening in a wall, said seal including a mounting member secured to said rotatable member and having impeller blades on one side adjacent the outer edge thereof with outwardly extending fluid circulating passages extending between said blades and the back side of said mounting member, and means including a flexible member secured on the front side of said mounting member with an enlarged engagement edge part extending when stationary into positive sealing engagement with a part extending from said wall and having such flexibility as to be deflected outwardly out of engagement with said stationary part by centrifugal force when rotated providing a closure over the front side of said mounting member fluid passages and providing for the recirculation of fluid through said fluid passages and outwardly by said blades for minimizing the passage of fluid longitudinally of said rotatable member through said wall opening.

4. A seal for a rotatable member having a part extending adjacent an opening in a wall, said seal including a mounting member secured to said rotatable member and having centrifugal impeller blades on one side adjacent the outer edge thereof with outwardly extending fluid circulating passages extending between said blades and the back side of said mounting member, means including a flexible member secured on the front side of said mounting member with a part extending when stationary into positive sealing engagement with said wall and having such flexibility as to be deflected outwardly out of engagement with said wall by centrifugal force when rotated providing a closure over the front side of said mounting member fluid passages and providing for the recirculation of fluid through said fluid passages and outwardly by said blades for minimizing the passage of fluid longitudinally of said rotatable member through said wall opening, and means including stationary vanes arranged in back of said mounting member for preventing the formation of a fluid meniscus in back of said mounting member on rotation thereof.

LAWRANCE W. WIGHTMAN.

REFERENCES CITED

The following references are of record in the file of this patent:

UNITED STATES PATENTS

| Number | Name | Date |
|---|---|---|
| 1,353,095 | Uttech et al. | Sept. 14, 1920 |
| 2,140,356 | Gutman | Dec. 13, 1938 |
| 2,171,968 | Augustin | Sept. 5, 1939 |
| 2,227,922 | Blackmore | Jan. 7, 1941 |